G. CARPENTER.
SIDEHILL PLOW.
APPLICATION FILED SEPT. 5, 1919.

1,375,626.

Patented Apr. 19, 1921.
2 SHEETS—SHEET 1.

Inventor
Grant Carpenter,
By
Attorney

UNITED STATES PATENT OFFICE.

GRANT CARPENTER, OF ELDRED, PENNSYLVANIA.

SIDEHILL-PLOW.

1,375,626.　　　　　Specification of Letters Patent.　　Patented Apr. 19, 1921.

Application filed September 5, 1919. Serial No. 321,822.

*To all whom it may concern:*

Be it known that GRANT CARPENTER, a citizen of the United States of America, residing at Eldred, in the county of McKean and State of Pennsylvania, has invented new and useful Improvements in Sidehill-Plows, of which the following is a specification.

The object of the invention is to provide a simple and relatively inexpensive construction of side hill plow adapted for adjustment to accommodate an inclination of the ground laterally in either direction without affecting the draft upon the plow beam and consequently without modifying the line of draft as applied to the latter.

Further objects and advantages will appear in the course of the following description of a preferred embodiment of the invention, it being understood that changes in form and proportion may be resorted to within the scope of the claim without departing from the principles involved.

In the drawings:—

Figure 1:
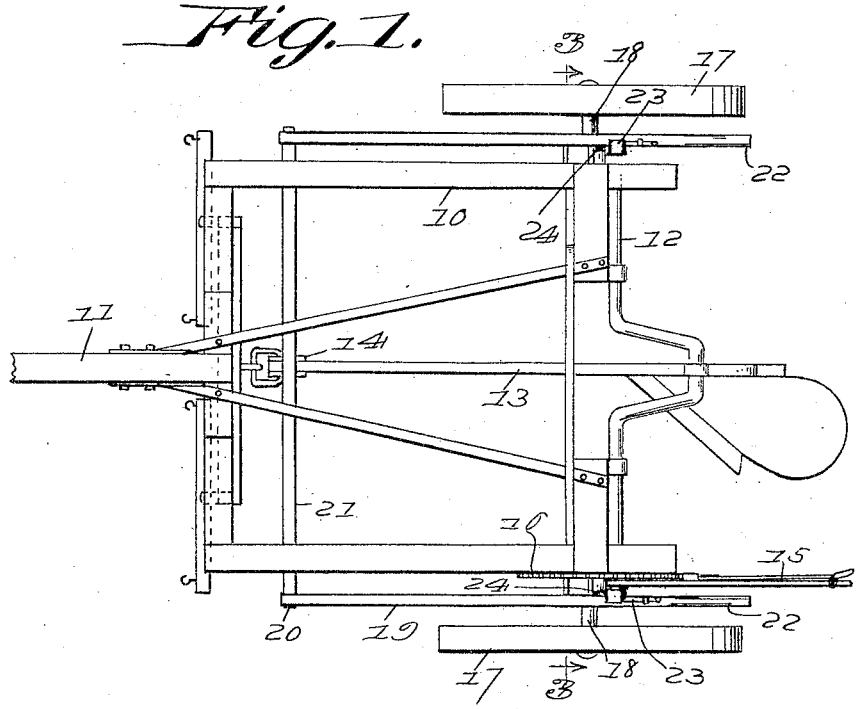
Figure 1 is a plan view.
Figure 2:
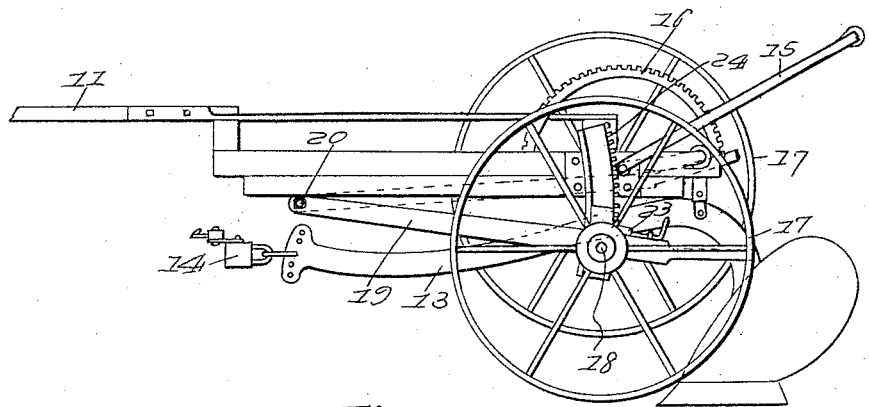
Fig. 2 is a side view.
Figure 3:
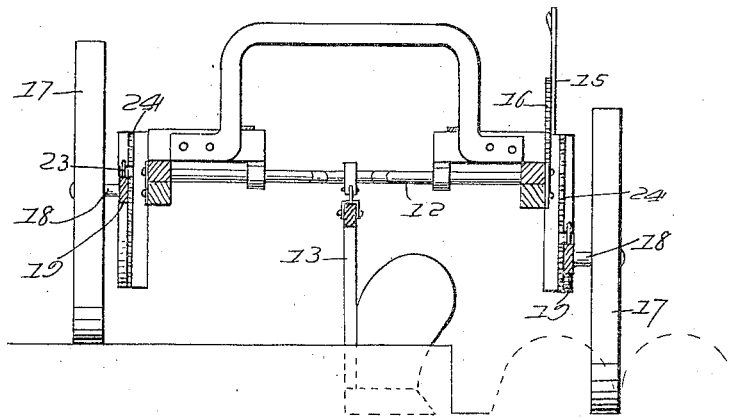
Fig. 3 is a transverse section on the plane indicated by the line 3—3 of Fig. 1.
Figure 4:
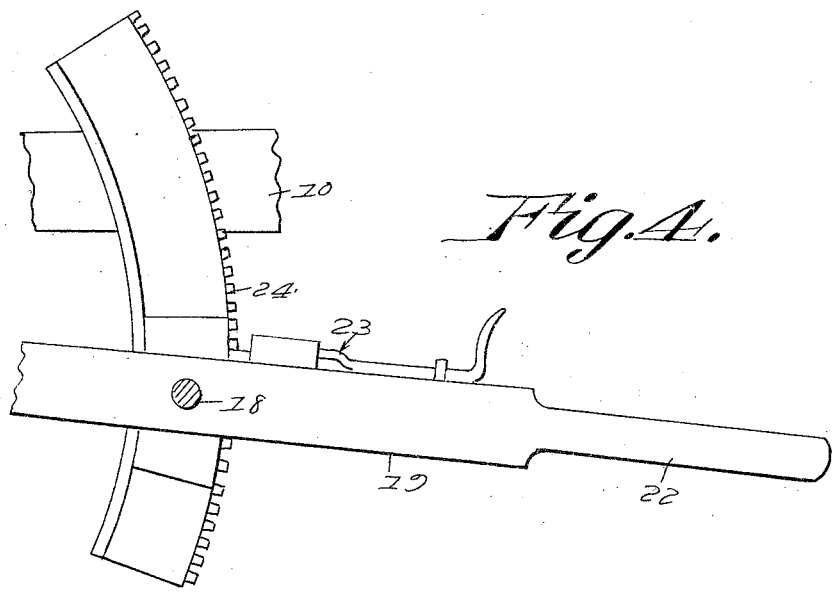
Fig. 4 is a detail view of the means for securing the wheel supporting arms in their adjusted positions.

Upon a suitable frame 10 to which the draft tongue 11 is attached is mounted a crank shaft 12 which supports the rear end of the plow beam 13 provided with any suitable cultivating plow or shovel and having connected with the front end thereof the draft appliances 14 such as a double tree or other means in common use in this connection. The adjustment of the crank shaft with reference to the frame to vary the depth of the plow is effected by means of a lever 15 operating in connection with a segment 16 or any equivalent means by which the parts may be secured in the desired adjusted relations.

The supporting wheels of the frame as shown at 17 are mounted upon stub axles 18 carried by arms 19 which are fulcrumed at 20 upon a transverse bar 21 carried by said frame, and these wheel supporting arms which are preferably extended rearwardly beyond the stub axles to form handles 22 are adapted to be secured in adjusted positions relative to the supporting frame by means of latches 23 engaged with the teeth of racks or segments 24 secured to said frame, to the end that in order to support the main frame in a horizontal position and thus preserve the proper position of the plow beam and the plow carried thereby, regardless of the inclination of the surface of the ground traversed, either of said ground wheel supporting arms may be adjusted upwardly or downwardly and may be locked at the desired adjustment by an operator following the plow. It will be seen that the adjustment to suit the condition of the ground surface may be accomplished during the progress of the machine and without loss of time and without special effort upon the part of the operator as may be required to insure the proper presentation of the plow and maintain the supporting frame in a substantially horizontal position. The adjustment of each supporting wheel is independent of the other so that a relatively wide range of adjustment is possible to secure the results indicated.

What is claimed is:—

A plow of the kind indicated consisting of a frame, rearwardly extending arms pivotally connected to the frame at their forward ends and provided adjacent their rear ends with laterally projecting stub axles, wheels mounted upon said stub axles, the rear extremities of said arms being formed to provide handles, segmental racks mounted on opposite sides of the frame adjacent said arms, latches carried by said arms and engageable with said racks, whereby the relative positions of the wheels may be varied vertically to support the frame in a horizontal plane when the machine is on an incline, and a plow carried by the frame.

In testimony whereof he affixes his signature.

GRANT CARPENTER.